July 8, 1947.   L. A. BLOCK   2,423,435
METHOD OF MAKING SOAP CAKE HAVING A DESIRED INSIGNIA
Filed Sept. 25, 1943   6 Sheets-Sheet 1

INVENTOR
LESLIE A. BLOCK.
BY George A. Gillette, Jr.
ATTORNEY

July 8, 1947.   L. A. BLOCK   2,423,435
METHOD OF MAKING SOAP CAKE HAVING A DESIRED INSIGNIA
Filed Sept. 25, 1943   6 Sheets-Sheet 2

INVENTOR
LESLIE A. BLOCK.
BY George A. Gillette, Jr.
ATTORNEY

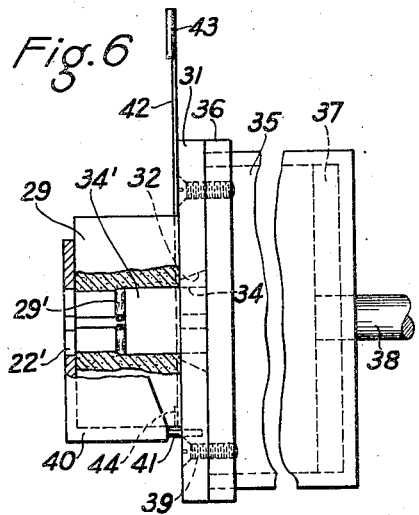
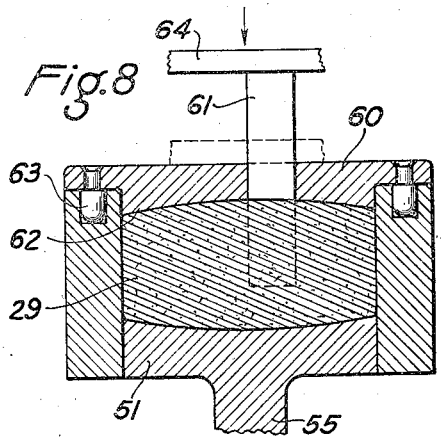
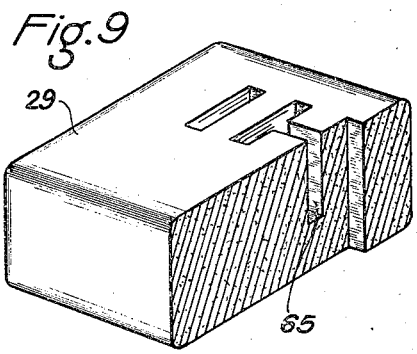
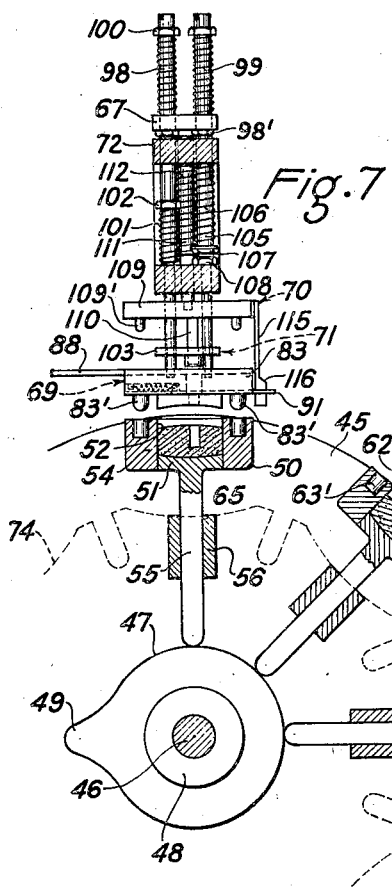
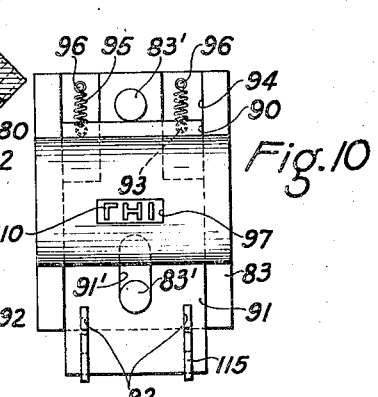

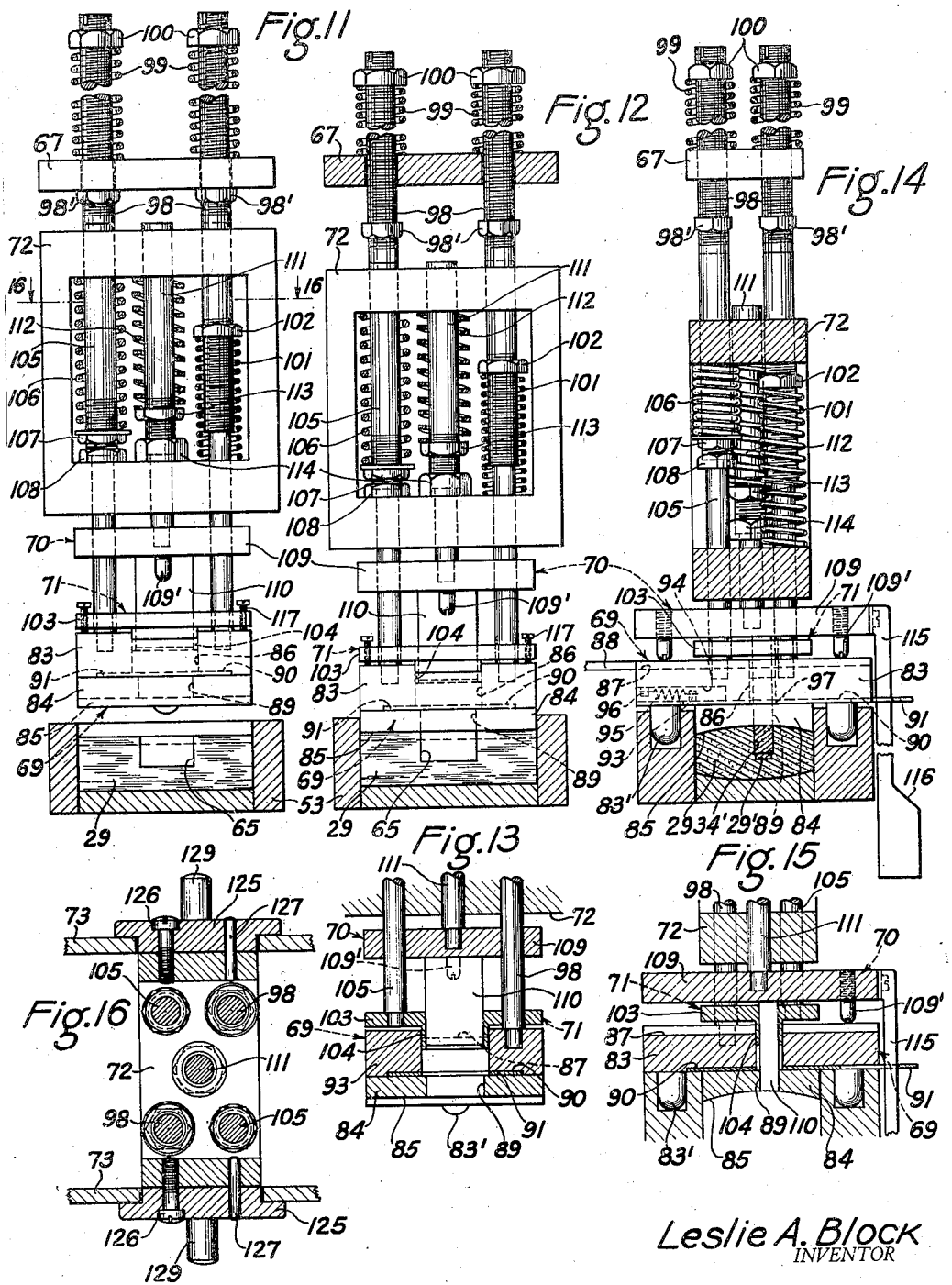

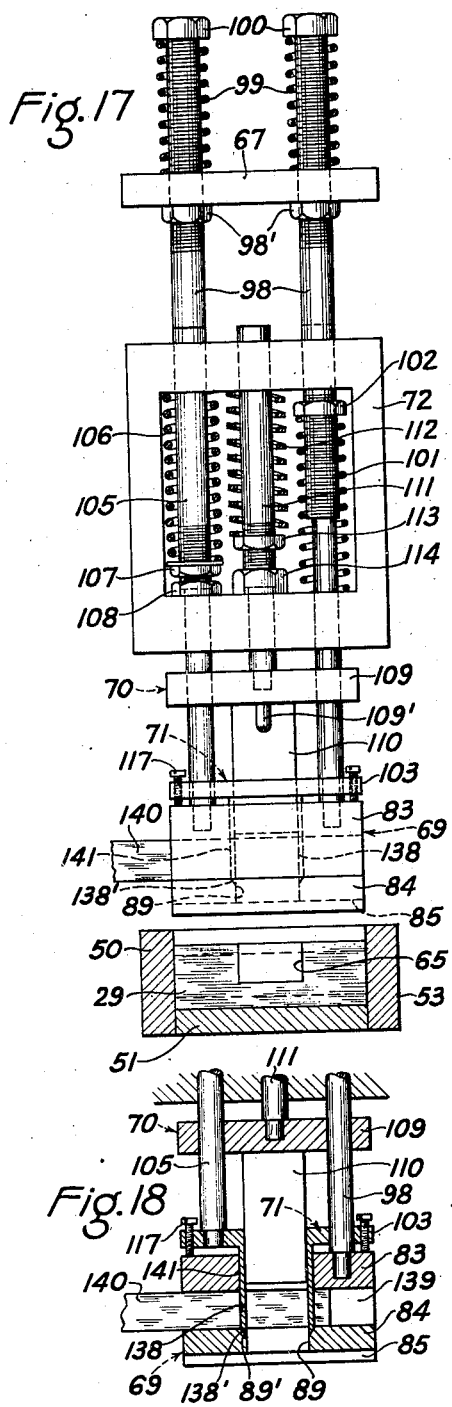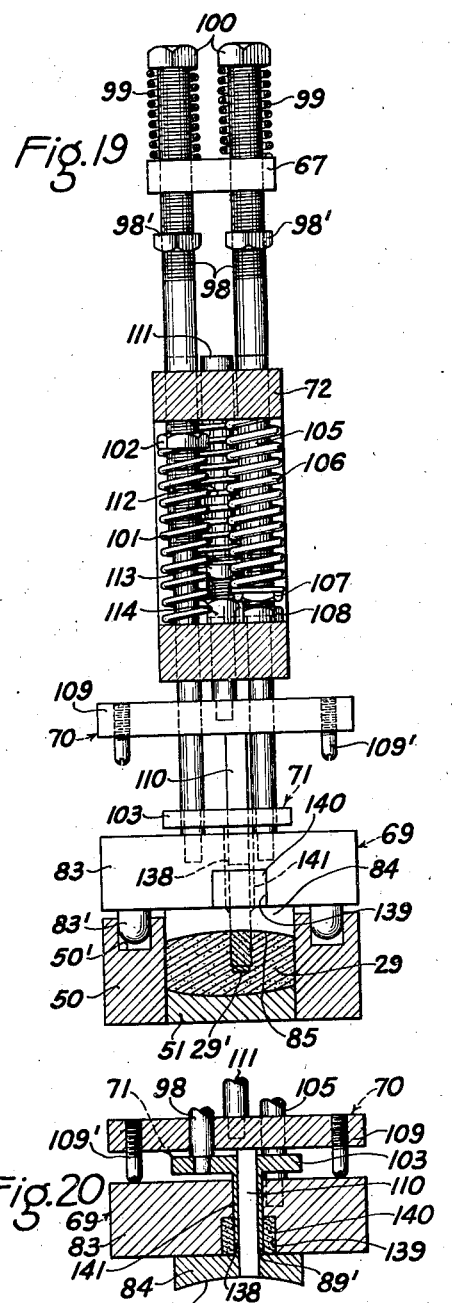

July 8, 1947.   L. A. BLOCK   2,423,435
METHOD OF MAKING SOAP CAKE HAVING A DESIRED INSIGNIA
Filed Sept. 25, 1943   6 Sheets-Sheet 6

Leslie A. Block
INVENTOR

BY George A. Gillette Jr.
ATTORNEY

Patented July 8, 1947

2,423,435

UNITED STATES PATENT OFFICE 2,423,435

METHOD OF MAKING SOAP CAKE HAVING DESIRED INSIGNIA

Leslie A. Block, Rochester, N. Y.; Wilton A. Block administrator of said Leslie A. Block, deceased Application September 25, 1943, Serial No. 503,792

13 Claims. (Cl. 252—90)

The present invention is a continuation-in-part of my co-pending application Serial No. 280,366, filed June 21, 1939, and relates particularly to a method of making a soap cake having a desired insignia.

While it is well-known that soap cakes having a desired insignia may be made by providing an aperture or recess in a soap cake and introducing a distinctively colored insert thereinto, such known methods and apparatus are not satisfactory because exact and precise registry is not obtained between the insert and the soap cake.

The primary object of the present invention is the provision of a method of making a soap cake having a desired insignia which is precisely complementary to said soap cake.

Another object of the invention is the provision of a method for introducing a distinctive insert into a soap cake and simultaneously forming and/or reforming the aperture or recess in the soap cake by means of the distinctive insert itself.

A further object of the invention is a method for providing a distinctive soap material with the grain therein in a predetermined plane and forming from such distinctive soap material an insert which is introduced into the soap cake with the grain of said insert substantially parallel to the display surface of said soap cake.

Still another object of the invention is a method of forming an aperture in a soap cake with a core having the contour of a desired insignia and forming a distinctive insert for introduction into said aperture in a forming die molded around the core used to make said aperture.

Other and further objects of the invention will be apparent or suggested to those skilled in the art by the description which follows.

The aforementioned and other objects of the invention are accomplished by a method for introducing a distinctive insert into a soap cake and simultaneously forming or reshaping an aperture in the soap cake by insertion of said distinctive insert so that the contour of the aperture and insert correspond precisely throughout. The technique of the invention is further enhanced by forming the distinctive insert of a soap material which is harder and drier than the soap cake, by previously providing an aperture in the soap cake which aperture is more or less re-shaped by the insert itself, by forming the insert in a die molded around the core for making said aperture, by arranging the grain of the soap material for the distinctive insert in a predetermined plane, either by pre-arrangement or by compression, and forming therefrom an insert which is introduced into the soap cake with its grain parallel to a display surface of the soap cake, and/or by introducing the freshly formed insert immediately into the soap cake to shape the aperture therein whereby the adjacent surfaces of the insert and aperture contact throughout and tightly adhere to each other.

The insertion and cementation of the distinctive inserts may be facilitated or improved by lubricating or wetting the walls of the aperture in the soap cake prior to or during the introduction of the distinctively colored insert into said soap cake. Also the fixation of the distinctively colored insert and the appearance of the composite soap cake may be further improved by subjecting said composite cake to a compressing and finishing operation in a cake finishing press of known design.

As used herein the term "insignia" shall mean and include one or more symbols, monograms, figures, letters, characters, trade-marks, designs, or the like; the term "distinctive" as used to describe the insert shall mean and refer to a different color or different shade of the same color for the insignia with respect to the color of the soap cake; and the words "aperture," "recess," "hole," etc., are applied interchangeably to the openings in the soap cake. The features of the invention are equally advantageous whether, as shown, the distinctive inserts extend partially or entirely through the soap cake.

Since the present invention is primarily directed to formation of a soap cake having a desired insignia, it is not necessary to describe the preparation and manufacture of the soap material itself. The only requirement is that the soap material shall be in a state ready and suitable for molding and may be in pulverized or powdered form. For instance, soap material as it comes from the plodder may be used as a starting material especially for the cake body while the soap material for forming the insignia may be dyed to a color and/or shade different from the soap cake by the addition or admixture of suitable dyes or pigments and is preferably dried or dehydrated in a known manner to be drier and harder than the soap material of the cake body.

Reference is hereby made to the accompanying drawings wherein similar reference characters designate similar elements and wherein:

Fig. 6 is a side elevation of a forming means for the distinctively colored inserts with a partial section through the soap cake and the receptacle therefor.

Fig. 7 is a fragmentary transverse section through an automatic machine for performing the invention.

Fig. 8 is a transverse section to enlarged scale of the soap cake recessing station of said machine.

Fig. 9 is a perspective view of the recessed soap cake with a section cut away through the insignia.

Fig. 10 is a bottom view of a cover member for the mold member of said machine.

Fig. 11 is a side elevation of a distinctive insert forming and injecting station at the second step of its cycle.

Fig. 12 is side elevation of said forming and injecting station at the third step of the cycle.

Fig. 13 is a fragmentary vertical longitudinal section of said insert forming and injecting station showing the relative positions of the piston and plunger members during said second and third steps of the cycle.

Fig. 14 is a vertical transverse section of said insert forming and injecting station at the fourth step of the cycle.

Fig. 15 is a fragmentary vertical transverse section of said insert forming and injecting station showing the relative positions of the piston and plunger members during the fourth step of the cycle.

Fig. 16 is a horizontal section through the actuating mechanism for the insert forming and injection means on the line 16—16 of Fig. 11.

Fig. 17 is a side elevation of a distinctive insert cutting and injecting station at the second step of its cycle.

Fig. 18 is a fragmentary vertical longitudinal section of said insert cutting and injecting station during said second step of the cycle.

Fig. 19 is a vertical transverse section of said insert cutting and injecting station during the third step of its cycle.

Fig. 20 is a fragmentary vertical transverse section of said insert cutting and injecting station during the fourth and during the final compression steps of the cycle.

Figure 1:
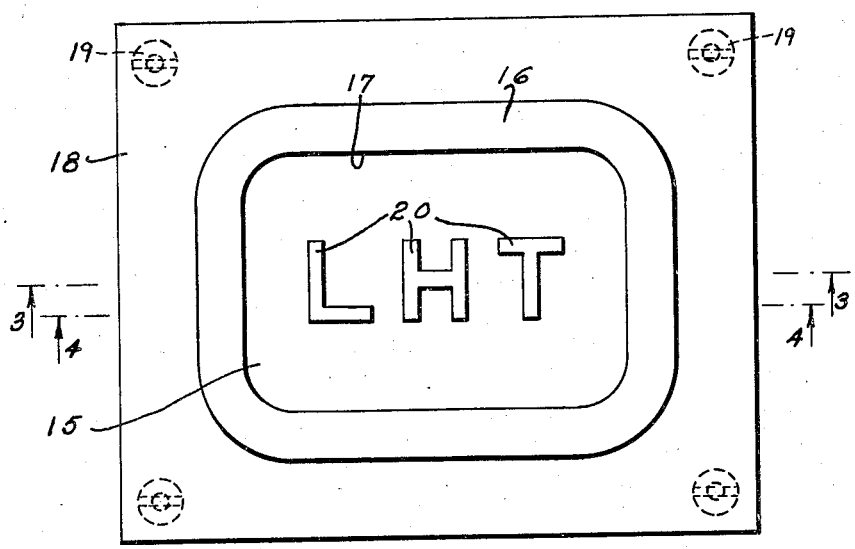
Fig. 1 is a plan view of a mold for forming the apertured cakes and also the insignia forming die.
Figure 2:
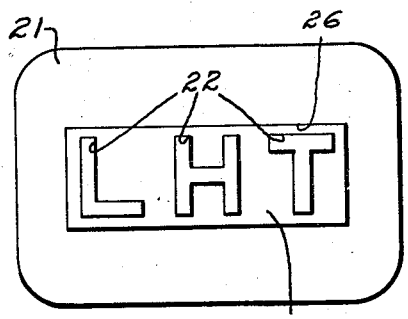
Fig. 2 is a plan view of an end plate for the molding press.
Figure 3:
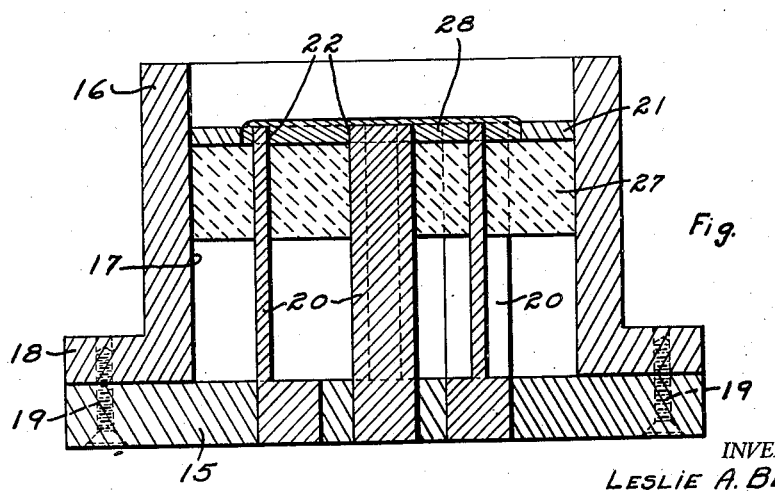
Fig. 3 is a vertical section of the mold taken on the line 3—3 of Fig. 1 and illustrating the manner of casting an end plate or forming die.

Although provision of recesses or apertures in the soap cake prior to the insertion of the distinctive inserts is shown herein and is preferred, it must be understood that the invention in its broadest aspects contemplates displacement of the soap material of the soap cake to receive the distinctive inserts solely by the action of the inserts themselves. However, the soap cakes may be provided with apertures extending completely through the cake or may be provided with recesses extending only part way through the soap cake. Such apertures or recesses may also be provided either when the soap cake is formed or may be provided by a punching operation later to be described.

Provision of the apertures simultaneously with the formation of the soap cake may be accomplished in a mold or press, an illustrative form of which is shown in Figs. 1–4 inclusive. Such a mold may comprise a base plate 15 and a mold form 16 providing a mold cavity 17 and having a flange 18 which is detachably secured to base plate 15 as by screws 19. The mold cavity 17 may have any desired form but is preferably rectangular with rounded corners and has its length and width in the ratio of 3:2.

One or more cores 20 are attached to or imbedded in said base plate 15. Each core 20 has a cross-section corresponding in form and of the same size as the desired insignia. As shown and for forming soap cakes said cores 20 have parallel sides.

The mold cavity 17 of the cored cake press is enclosed by top and bottom members which prevent the leakage of soap material being molded when said members are pressed toward each other. The bottom member has the same form as the cross-section of cavity 17 and may comprise a metal bottom plate 21 provided with openings 22, see Fig. 2, complementary to the cores 20, and a covering layer of leather 23 also provided with openings complementary to said cores 20. The top member is similarly formed and may comprise a metal top plate 24 and a subjacent layer of leather 25 both of which are also provided with openings complementary to the outlines of the cores 20.

The openings such as 22 in the plates 21 and 24 may be formed to fit precisely over the cores 20 in any desired manner but one convenient and accurate manner of forming said openings will now be described with respect to plate 21. Plate 21 may be made of sheet metal such as brass and is provided with a large opening 26 which fits over the cores 20 with considerable clearance. A layer of refractory material 27, such as asbestos, is placed in mold cavity 17 and is packed around the cores 20. The asbestos layer 27 is arranged to support the plate 21 preferably with the top surface thereof flush with the top surfaces of the cores 20, see Fig. 3. A metal of low melting point, such as type metal, is then flowed in molten condition into the opening 26 and may overflow slightly or enough to cover the ends of cores 20. If necessary pressure may be applied to the surface of the molten type metal so as to force said type metal to conform accurately to the outlines of cores 20 and said core 20 may be coated with lamp black or similar material to prevent the body of cast metal 28 from sticking to the surfaces of cores 20. The plate 21 is then removed from the mold form 16 and the excess metal is removed or ground from one or both sides of plate 21 to leave accurately and clearly defined openings 22 in the cast metal portion 28.

Figure 4:
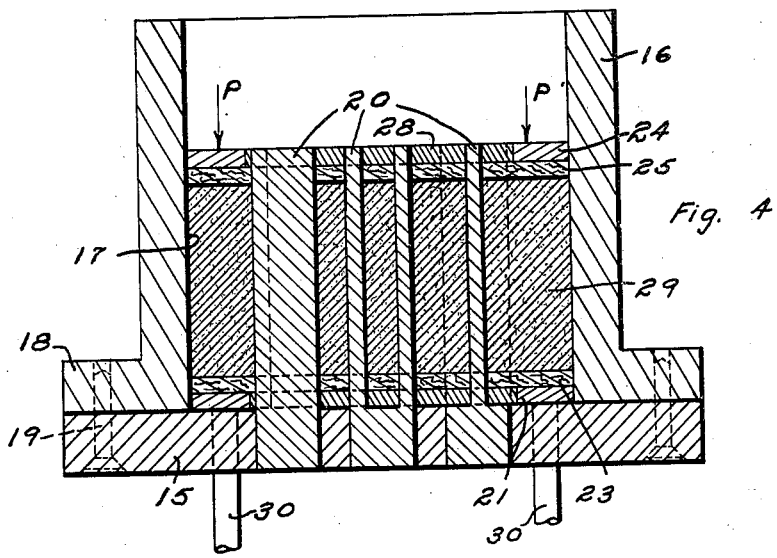
Fig. 4 is a vertical section of the mold taken on the line 4—4 of Fig. 1 and showing the metal and leather end members therefor.

The soap cake with apertures like the insignia extending therethrough may be formed by introducing a mass of pulverized or powdered moldable material, or of soap as obtained from the plodder, into the mold cavity 17 over the bottom leather layer 23 and around the cores 20, see Fig. 4. The soap cake 29 is then compressed to conform to the outlines of the mold cavity 17 and of the cores 20 by exerting in any suitable manner upon the top plate 24 a pressure which is represented by the arrows P. As a result, a homogeneous cake 29 is formed of soap and said cake 29 is simultaneously provided with one or more apertures corresponding in outline to the insignia desired. The formed cake 29 is then removed from mold cavity 17 in any convenient manner such as by means of ejecting pins 30 which may move the bottom plate 21, leather layer 23 and cake 29 with respect to cores 20 and mold cavity 17 so that the cake 29 may be extracted.

The next step in making of the composite soap cake is the separate molding of distinctively colored soap inserts. Such formation of the distinctively colored inserts may be accomplished in any suitable manner but is preferably effected by extrusion or by forcing the distinctively colored soap through a die.

In order to save considerable time and expense and for an inherent advantage explained hereinafter, the extrusion die is preferably made in a manner quite similar to that in which plates 21 and 24 were formed and now to be described. The mold form 16 is removed from the base plate 15 after unscrewing the screws 19, see Fig. 3. A layer of asbestos is placed over base plate 15 and around cores 20. A die plate 31 is provided with a diverging opening 32 and is placed over said asbestos layer on base plate 15 with the larger or divergent side of said opening 32 down. The opening 32 is large enough to clear the cores 20, which as before may be coated with lamp black or the like, a metal of low melting point is flowed in molten condition into said opening 32 and may be placed under pressure as by pressing upon the surface of the molten metal. The cast metal portion 33 is consequently provided with one or more openings 34 which correspond exactly with the outlines of cores 20.

A pressure means may comprise a cylinder 35 having a flange 36 and including a piston 37 and piston rod 38. The die plate 31 is detachably fastened to flange 36 by a plurality of bolts 39 and with the larger or divergent side of opening 32 facing the pressure means or piston 37. The cylinder 35 is filled with a quantity of distinctively colored erodible moldable material and a pressure is exerted on piston rod 38 whereupon one or more distinctively formed bodies 34' are forced through the openings 34 of die plate 31. The divergence of opening 32 insures that the cast metal portion 33 will not be dislodged from die plate 31 by the pressure of the soap being extruded. This feature is especially advantageous when, according to a preferred procedure, the distinctively colored bodies are extruded from a dehydrated or drier soap which may be heavily dyed or pigmented.

The distinctively formed and colored bodies 34' are then inserted into the cored apertures of the molded cake 29. Such step may be manually performed but is preferably combined with the extrusion procedure so that said distinctively formed and colored bodies 34' are extruded directly into said apertures of cake 29. To this end a cake receptacle 40 having an end wall provided with apertures 22' may be removably mounted adjacent the die plate 31, or may be detachably supported by dowel pins 41 from said die plate 31. It is also very convenient for the operator merely to hold the cake 29 in front of the die plate 31 during the extrusion of the distinctively colored bodies 34' into said cake 29.

An inherent result of forming the aperture in the soap cake in the manner described and of pressing the distinctive insert through a die formed around the core used to form such aperture is that the insert is somewhat larger than the aperture in the soap cake so that the introduction of the insert reforms or reshapes the aperture. This effect may be on account of a certain resiliency of the soap material in the cake after removal of the core and/or may be on account of some expanding of the insert after passage through the forming die. In any event such reshaping of the cake aperture by the distinctive insert itself has certain important advantages, to wit: perfect and precise registry of the distinctive insert with the soap cake is assured, the adjacent surfaces of the soap cakes and insert are in contact throughout, and the walls of the reshaped cake aperture are more adhesive or tackier than a soap surface that has been exposed to air for any appreciable time and, of course, this effect is increased when the newly formed distinctive insert is immediately introduced and/or extruded directly into the soap cake.

The insertion of the distinctively colored bodies 34' into the apertures of cake 29 is considerably facilitated by lubricating the walls of the apertures in said cake 29. As in the case of a soap cake 29 and distinctively colored inserts of soap, the walls of the apertures may be lubricated merely by wetting with water by immersion or with a wet brush. Also such lubrication and particularly the wetting with water of the walls of said apertures in a cake of soap facilitates reshaping of the cake apertures by the inserts and/or considerably improves the fixation by cementation or adhesion of the soap inserts within the soap cake 29.

The rates of extrusion of the distinctively colored inserts 34' through the apertures 34 of die plate 31 may vary according to the outline and area of each aperture 34 or according to the outline and area of adjacent apertures 34. Because of such differences in the extrusion rates of the inserts 34', the leading ends of the various inserts will not simultaneously come through the cake 29. For this reason receptacle 40 is provided with apertures 22'.

After the apertures in the cake 29 are filled, the extruded distinctively colored bodies 34' may be cut off by a severing means. Such severing means may be a separate wire or knife or may be a knife having a handle 43 and pivoted to the die plate 31 by a stud 44.

The method and apparatus previously described embody several fundamental principles which are well adapted to incorporation in an automatic machine about to be described. In addition, certain improvements in the method of the invention will be disclosed in connection with such automatic machine, although it will be apparent that such improvements may also be used in a semi-automatic or manually operated machine.

Figure 21:
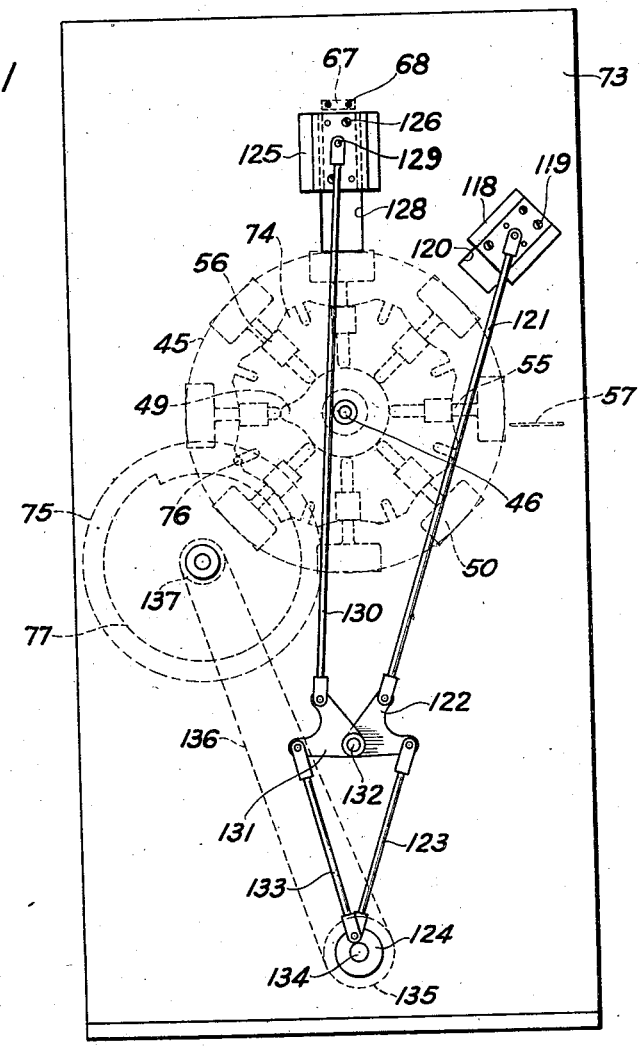
Fig. 21 is a side elevation of the automatic machine for practising my invention showing the actuating mechanism for the cake perforating and insert injecting stations thereof.

The automatic machine for performing the method of the invention comprises a frame including side walls 73, see Fig. 21, and a carrier for a plurality of mold members which are moved to various stations such as a loading station, a cake perforating station, and an insert forming or cutting and injecting station. Such a carrier may comprise a pair of disks 45, see Figs. 7 and 21, mounted in spaced relation on and for rotation about a fixed shaft 46 which is mounted between the side walls 73 of the frame of the machine. A cam member 47 is fixedly mounted between said disks 45, includes a collar 48 attached to said fixed shaft 46, and includes a rise 49 for a purpose to be mentioned later.

Each of the mold members is mounted between said disks 45 and each mold member comprises a hollow frame 50 and a bottom member 51. Said hollow frame 50 provides a mold cavity 52, has end walls 53 which are fastened to said disks 45 and has side walls 54. The bottom member 51 fits into said frame 50 to close one side of said mold cavity 52 and has a stem 55 movable within a block member 56 mounted between said disks 45. Said bottom members 51 are normally held in any suitable manner with the ends of stems 55 bearing against the periphery of cam member 47. An indexing mechanism for the carrier may comprise a Geneva gear 74 mounted on one of said disks 45 and a driving member including a disk 75 carrying a pin 76 for engaging the radial slots of said Geneva gear 74 to move the same intermittently and a sector 77 on disk 75 engages the periphery of gear 74 to hold the same stationary between rotations thereof.

The loading station may comprise a conveyor 57 which brings the soap cakes 29 into position opposite the cavity 52 in the mold member at the loading station and a loading plunger 58 is reciprocated within a support 59 to push the successive soap cakes 29 into said cavity 52 of the mold member. Whereupon the disks 45 are rotated to bring the mold member and soap cake therein to a perforating station.

The provision of a perforating step or station for the soap cake 29 is optional because the apertures or recesses 65 may be provided in said soap cake 29 prior to its being placed on the conveyor 57 of the loading station or because such apertures or recesses are not necessary when the distinctive inserts themselves perforate the soap cake at the insert forming or cutting and injecting station in the manner suggested herein.

Such a perforating station, if provided, may comprise a cover member 60 and a perforating member. Said cover member 60 has a cake contacting portion 62 and a pair of dowels 63. The perforating member includes a plunger 61 having the contour of the desired insignia and mounted upon a plate 64.

The actuating means for said cover and perforating members includes a frame head 78, a pair of actuating rods 79 extending through said head 78 and attached to the cover member 60, and an actuating rod 80 also extending through head 78 but attached to the plunger plate 64. Coil springs 81 encircle rods 79 and a coil spring 82 encircles rod 80, and the tension in said springs 81 and 82 may be adjusted respectively by nut members 81' and 82' to cause the sequence of movements about to be described. Cheek plates 118, see Fig. 21, are attached to each side of the frame head 78 by bolts 119 and slidably engage the sides of openings 120 in the side walls 73. A connecting rod 121 is pivotally connected at one end to a cheek plate 118 and at its other end to a bell crank 122 which is pivoted upon side wall 73 and which is oscillated by a second connecting rod 123 also connected to bell crank 122 and eccentrically pivoted to a driving disk 124.

During each cycle of the machine said actuating means moves the head 78 toward and away from the carrier for the mold members. Movement of the head 78 toward a mold member moves the actuating rods 79 through compression of springs 81 to project the cake contacting portion 62 and dowels 63 of the cover member 60 into the mold cavity 52 and recesses 63' respectively. At the same time, the plunger 61 is moved toward the soap cake 29 and continued movement of head 78 through spring 82 and actuating rod 80 moves plate 64 to project perforating plunger 61 into the soap cake 29. Plunger 61 is moved into the soap cake 29 to any desired depth, preferably that indicated by the dotted lines in Fig. 8, or somewhat more than half way through the soap cake 29. Such depth of penetration of plunger 61 being determined by the eccentricity of the connection of rod 123 to disk 124 and/or by the radii of the arms of the bell crank 122.

Return of the frame head 78 to the position shown in Figs. 7 and 21 retracts said plunger 61 and cover member 60 from the mold member and the soap cake therein is provided with one or more apertures 65 in the shape of the desired insignia.

The insert forming and injecting station is also slidably mounted within openings 128 in the side walls 73 of the machine frame. Cheek blocks 125 are fastened to opposite sides of a frame head 72 by means of bolts 126 and dowel pins 127, see Fig. 16. A support member 67 is fastened at opposite ends to side walls 73 by bolts 68. Said insert forming and injecting station comprises a cover member 69, a plunger member 70, a piston member 71, and an actuating means for operating said members in a cycle composed of five steps. Said actuating means includes a frame head 72 which is reciprocated radially of the mold member carrying the soap cake 29 and a plurality of rods extend through said frame head 72 and beyond the support member 67.

The cover member 69 comprises a block 83 having a projection 84 adapted to fit into the hollow frame 50 and having a concave soap cake engaging surface 85. Said block 83 is provided with an insert soap cavity 86 and with a guideway 87 for conducting a strip 88 of a distinctively colored soap over said cavity 86. One or more apertures 89 having the shape or contour of the insignia to be imbedded in the soap cake, are provided in said projection 84 and extend from the bottom of cavity 86 to the soap engaging surface 85 of the cover member 69. A slideway 90 is provided in the bottom of block 83 for a slide 91 which extends beyond one end of said block 83 and which is there provided with a pair of slots 92. The other end of slide 91 carries a pair of pins 93 which extend into recesses 94 in block 83. Springs 95 in said recesses 94 have one end connected to said pins 93 and the other ends connected to a pair of pins 96 within recesses 94 to hold the slide 91 normally in position against one of dowels 83' and with an opening 97 in said slide 91 opposite the apertures 89 in said projection 84. Slide 91 is also provided with an elongated slot 91' for permitting movement of slide 91 with respect to the other dowel 83'.

A pair of actuating rods 98 are attached to diagonally opposite corners of the block 83 of the cover member 69 and each extends upwardly through the frame head 72 and through and beyond the support member 67. A pair of coil springs 99 encircle said actuating rods 98 above said support member 67 and a pair of nuts 100 are threaded onto the upper ends of said rods 98. Another pair of nut members 99' are threaded onto rods 98 to limit the upward movement thereof under the action of springs 99. A second pair of coil springs 101 encircle rods 98 between the ends of the frame head 72 and a nut 102 is threaded on each rod 98 for adjusting the tension in said springs 101 between the bottom of frame head 72 and said nuts 102.

The piston member 71 comprises a plate 103 and a piston 104 adapted to fit into the cavity 86 in said block 83. Said piston 104 is attached to or is integral with plate 103 and extends downwardly therefrom. Also the piston 104 is provided with one or more apertures having the shape and contour of the desired insignia. The plate 103 is provided at one pair of diagonally opposite corners with openings through which the actuating rods 98 slidably extend and a second pair of actuating rods 105 are attached to the other pair of diagonally opposite corners of plate 103 and such rods 105 extend upwardly through the frame head 72. A coil spring 106 encircles each of said rods 105 between the top of said frame head 72 and a nut 107 is threaded onto each of rods 105. A nut member 108 is also threaded onto each of rods 105 between the ends of frame head 72 and each is adapted to abut the bottom end thereof.

The plunger member 70 comprises a plate 109 and one or more plungers 110 which have the same shape and contour as the desired insignia and which fit into the apertures in piston 104 and are adapted to fit into the apertures 89 in the projection 84 of the cover member 69. Said plungers 110 are attached to or are integral with plate 109 and extend downwardly therefrom. Said plate 109 is provided near its corners with holes through which extend the actuating rods 98 and 105 of the cover member 69 and of the piston member 71, respectively. An actuating rod 111 is attached at its lower end to the center of plate 109 and extends upwardly through the frame head 72. A coil spring 112 encircles said rod 111 between a nut 113 threaded thereon and the upper portion of frame head 72. An adjusting nut 114 is also threaded onto rod 111 and is adapted to abut against the lower portion of frame head 72. A pair of abutments 109' are adjustably attached or threaded into plate 109 and extend downwardly therefrom for a purpose to be described.

The slide 91 may be automatically operated in any suitable manner as by a pair of cam members 115 mounted upon the plate 109, extending downwardly through the slots 92 in slide 91, and each having a rise 116 at the lower end thereof.

The frame head 72 of the insert forming and injecting station is slidably mounted in the frame of the machine and is reciprocated in timed relation to the indexing means for the mold carrier. A pair of flanged cheek blocks 125 are fastened to opposite sides of head 72 by means of bolts 126 and dowel pins 127, see Fig. 16. Said blocks 125 engage and slide within rectangular openings 128 which are provided in side walls 73 of the machine frame. Pins 129 extend laterally from each block 125 and are each journaled in one end of a connecting rod 130 having its other end pivotally connected to a bell crank 131 which is rotatably mounted in common with bell crank 122 on a shaft 132 extending between the side walls 73, see Fig. 21. A second connecting rod 133 has one end connected to bell crank 131 and has its other end eccentrically pivoted to the driving disk 124. Said driving disk 124 is mounted upon a shaft 134 journaled in side walls 73 and driven in any suitable manner by a prime mover or motor, not shown.

Rotation of shaft 134 and driving disk 124 reciprocates connecting rods 133 and 130 and bell cranks 122 and 131 whereby cheek blocks 125 and frame head 72 are reciprocated through a stroke determined by the eccentricity of the connection of connecting rod 133 to disk 124, and/or by the radii of the arms of bell crank 131 to which the connecting rods 130 and 133 are connected.

The actuating means for the insert forming and injecting station and/or for the cake perforating station are operated in timed relation to the indexing means for the mold carrier. For this purpose a sprocket 135 on shaft 134 is encircled by a chain 136 which also encircles a sprocket 137 attached to the driving disk 75 for the Geneva gear 74. As a result, the driving pin 76 moves said Geneva gear 74 when the cheek plates 118 and cheek blocks 125 and the associated frame heads 78 and 72 are at the uppermost ends of openings 120 and 128 and when the mold and/or soap cake engaging members of said stations are retracted and spaced from the mold members of the intermittently rotated carrier.

The operation of the insert forming and injecting station shown in Figs. 7 and 11–16 will not be described.

At the beginning of the cycle, the actuating means for and members of the insert forming and injecting station are in the positions shown in Fig. 7, the frame head 72 of said actuating means is in its uppermost position, the cover member 69 is spaced from the mold frame 50, piston member 71 is spaced from the bottom of guideway 87 sufficiently for introduction of the strip 88 of insert soap therebetween, plunger member 70 has the lower face or faces of the plunger 110 approximately flush with the bottom of piston 104, and the rises 116 on cam members 115 are in engagement with the outer ends of slots 92 to hold slide 91 outwardly against the action of spring 95 so that said slide 91 covers the apertures 89 in projection 84 of the cover member 69. At this time the coil springs 99 and 101 are under tension and hold the cover member 69 away from the mold member and nut members 98' abut against support member 67.

The first step of the method or insert forming cycle of the machine is illustrated in Fig. 11 and takes place during the first part of the downward movement of frame head 72 of the actuating means. During such movement of frame head 72 the compression on springs 106 and 112 is increased to exert a thrust on actuating rods 105 and 111, to move plates 103 and 109 toward the block 83, and to move piston 104 and plunger or plungers 110 through the strip 88 of insert soap into the cavity 86 in block 83. The volume in the strip 88 sheared off and pressed into cavity 86 is approximately equal to the volume of the insignia and the thickness of strip 88 and/or the amount of the strip 88 fed into said cavity 86 may be varied to maintain the relationship for insignia of different volume. The compression of the insert soap within the cavity 86 also arranges or orients the grain of the soap for the inserts so that such grain will be perpendicular to the pressure exerted by the piston and plunger members. When starting up the machine, it will obviously be necessary to fill cavity 86 with insert soap or several sections of strip 88 of insert soap.

In accordance with one form of the invention the insert soap may be of a harder and/or drier soap material than that constituting the base cake. Also the grain in the insert strip 88 is preferably in a plane perpendicular to the path of movement of the plunger member 70 and the piston member 71.

In addition the springs 106 and 112 are so selected and arranged that the approximately flush relationship is maintained between the bottom faces of piston 104 and plungers 110 during this first step so that there will be no disturbance of the grain in the insert soap being compressed.

It will also be noted that the bottom of cavity 86 and/or the apertures 89 are closed by slide 91 during such compression of the insert soap but it is to be understood that the provision of such a slide is optional because with insignia of small area and/or insert soap of sufficient hardness or dryness the extrusion through apertures 89 during compression will be negligible and will not disturb the re-arrangement of the grain for the insert or at most will only disturb the grain in the lower part of the insert.

The movement of plates 103 and 109 toward block 83 continues until adjustable stops 117 thereon abut against block 83 and adjustment of said stops 117 permits control of the distance which piston member 71 enters into the cavity 86. During said first step of the cycle, the thrust of springs 106 and 112 is exerted against springs 99 only through the soap material in cavity 86. The predominance of springs 99 prevents any appreciable movement of the cover member 69 and the difference between the resistance of springs 99 and the effort of springs 106 and 112 determines the pressure exerted on the insert soap in cavity 86, which pressure is sufficient to orient the grain in said insert soap.

Continued movement of frame member 72 after stops 117 on plate 103 abut against block 83 accomplishes the second step of my improved method and apparatus, as shown in Fig. 12. Such movement of frame member 72 after compression of the insert soap in cavity 86 and abutment of stops 117 with block 83 further increases the compression of springs 106 and 112 whose efforts are now exerted directly against the block 83 and springs 99 are now compressed. As a result cover member 69 is moved toward the mold member and the soap cake engaging surface 85 of projection 84 is moved against the display surface of the soap cake 29 within the frame 59 of the mold member and dowels 83' on block 83 are moved into corresponding recesses in said frame 59. At the same time, and as the third step of the cycle the plunger member 70 and the piston member 71 are both moved toward the soap cake but the lower faces of piston 104 and of plungers 110 are maintained in substantially flush relationship on account of the relative characteristics of the springs 106 and 112, see particularly Fig. 13. Since plate 109 has not moved relatively to plate 103, the slide 91, if provided, is still in closed position.

During the fourth step of the cycle, the distinctive inserts are projected or injected into the soap cake 29, see Fig. 14. The actuating means for said insert forming and injecting station moves the frame head 72 farther toward the mold member and spring 112 is compressed still more to exert a thrust on plate 109 and move the same toward block 83 of cover member 69. Such relative movement of plate 109 moves rises 116 of cam members 115 out of the slots 92 in slide 91 and springs 95 thus act to move one end of slide 91 against one of the dowels 83' on block 83 in which position the opening 97 in said slide 91 is opposite the ends of plungers 110 and in registry with the bottom of cavity 86, see Fig. 10.

Figure 5:
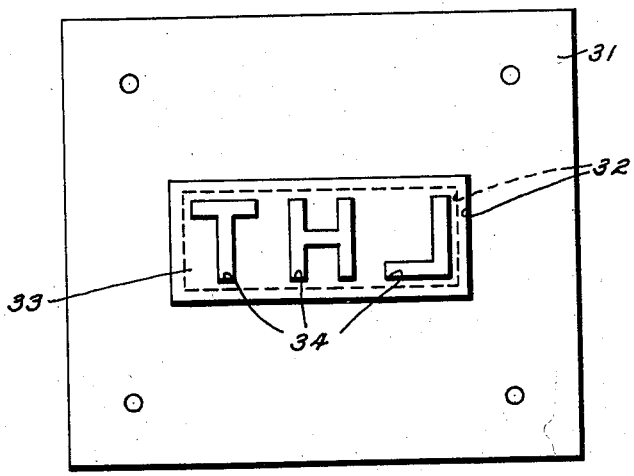
Fig. 5 is a plan view of the die plate for forming the distinctively colored inserts.

Further movement of plate 109 toward block 83 projects plungers 110 through piston 104 and presses distinctive inserts 34' out of the compressed insert soap in cavity 86 and into the soap cake 29. Since the apertures 89 in projection 84 are formed by molding around the cores or perforating plungers 61 in the manner described with respect to Figs. 3 and 5, such injection or insertion into the apertures 65 in soap cake 29 will be accompanied by a reforming or reshaping of said apertures 65 by the distinctive inserts 34' which themselves cut a portion or shaving 29' from the walls of apertures 65 in cake 29, as shown in Figs. 6, 14 and 19. The movement of plate 109 and plungers 110 with respect to block 83 and projection 84 is limited by engagement of abutments 109' with the top of block 83. Said abutments 109' may be adjustable and are arranged so that the ends of plungers 110 are precisely flush with the cake engaging surface 85 of the cover member 69 at the completion of the fourth step of the cycle. If such soap cake engaging surface 85 is concave, as shown, the ends of plungers 110 are also concave to form therewith a smoothly curved surface.

The stroke of plungers 110 is preferably so selected or adjusted as to project into the soap cake 29 a distinctive soap insert 34' equal in length to one half the thickness of the soap cake 29. Since the apertures 65 extend more than half way into the cake 29, the soap material 29' which is scraped or shaved from the walls of apertures 65 by the inserts 34' will fill in the extra depth of said apertures 65, see Fig. 14. The stroke of the perforating plungers 61 may be increased or decreased depending upon the space required by the soap material removed by the reshaping of apertures 65 by the inserts 34'.

Figure 22:
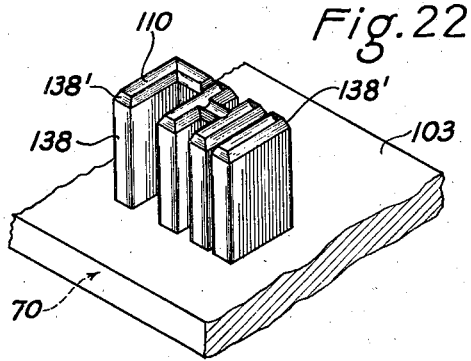
Fig. 22 is an inverted perspective view of the cutting and plunger members of the insert cutting and injecting station.

An important advantage of injecting the distinctive inserts 34' in the manner just described is that the outer ends of said inserts 34' may be formed to conform more or less to the display surface of the soap cake 29 without the necessity of a cut-off operation upon the inserts which leaves an objectionable shiny area on said display surface adjacent the inserts 34'. Another advantage of injecting the inserts 34' in the manner described is that the ends of plungers 110 may be formed with a curvature different and/or reverse from the curvature of the display surface of the cake 29, and abutments 109' may be adjusted so that the ends of plungers 110 at the end of their stroke extend slightly into the cake 29 to give a recessed effect. Alternatively, the ends of plungers 110 may be more sharply concave than the surface of cake 29, see Fig. 22, and abutments 109' may be adjusted so that only the edges of such concave ends of plungers 110 are flush with the display surface of cake 29 to give an embossed effect.

As previously suggested, the immediate injection of the inserts 34' after their formation and the reshaping of the apertures 65 by such recently formed inserts renders the contacting surfaces of the cake and inserts tackier and/or more adhesive so that the fixation of the inserts within the cake is improved. This advantage is obtained whether the apertures 65 are pre-formed in the cake 29 or whether the inserts 34' are of a harder and drier soap material and themselves effect the penetration of the soap cake.

Finally, the soap cake 29 with the insert 34' therein is subjected to a compression which finishes the surfaces of the cake. Such finishing operation is accomplished by further movement of the frame head 72 to bring the block 83 of cover member 69 against the face of hollow frame 50 of the mold member, see Fig. 15. During such finishing compression the ends of plungers 110 and the cake engaging surface 85 of the cover member are maintained in the same relative positions as at the end of the fourth step of the cycle or as maintained by the abutments 109'.

Upon the return stroke of the frame head 72 the compression on springs 99, 106 and 112 is relieved and the lower portion of frame head 72 abuts against adjusting nut 114 and nut members 108 respectively to return the plunger member 70 including plate 109 and plungers 110 and the piston member including plate 103 and piston 104 to their uppermost positions as shown in Fig. 7. At the same time springs 99 raise the cover member 69 including block 83, projection 84 and actuating rods 98 until nuts 98' thereon abut against the support member 67. Such return of frame head 72 to its upper position also places springs 101 under compression which act upon nuts 102 to assist in raising rods 98 and to urge nuts 98' against support member 67.

After such return of the parts of the insert forming and injecting station to their uppermost or retracted positions, the strip 88 of insert soap is advanced manually or by any suitable mechanism to feed an additional supply of insert soap along the guideway 87 into the cavity 86 in block 83. As previously explained, the indexing means is timed to move the carrier and mold members thereon when the parts of all the stations are spaced from the carrier and the cycle may be repeated in the manner just described.

Inasmuch as the insert soap material is subjected to pressure in the cavity 86 to orient and/or rearrange the grain of such soap material so that such grain will be substantially parallel to the display surface after insertion into the soap cake, the grain in the strip 88 of insert soap being fed into the compression chamber may extend in any direction. However, if the insert soap material is fed in strips or blocks having a depth equal to that of the insert 34' and if the soap grain in such strips or blocks is already in a predetermined plane, the construction and operation of the insert forming and injecting station may be simplified and improved in the manner next to be described.

In general such improvement of the insert forming and injecting station comprises the provision of a deeper guideway for feeding a soap strip equal in thickness to the depth of the inserts and the substitution of a cutter or cutters having the contour of the desired insignia in place of the piston 104 of the piston member 71 of the previously described insert forming and injecting station.

According to this other embodiment of the invention, the insert forming and injecting station comprises a cover member 69, one or more cutters 138, a plunger member 70, and an actuating means to operate said members. Said cover member 69 includes a block 83 carrying a projection 84 with a concave cake engaging surface 85 for engaging the display surface of a soap cake 29 within a mold member which is opposite the station and which comprises a hollow frame 50 and a movable bottom member 51. Said block 83 is provided with a guideway 139 for a strip 140 of insert soap material having its grain in a predetermined plane which is parallel to the bottom of said guideway 139 or substantially parallel to the display surface of cake 29 in the mold member. Said guideway 139 is preferably located with its lower surface even with the top of projection 84 and is of a depth and width sufficient to receive a strip 140 of distinctive or insert soap material having a depth or thickness equal to the desired depth of the distinctive inserts and having a width greater than the lateral extent of the insignia. Said block 83 is also provided with one or more openings 141 extending from the top thereof to said guideway 139 and projection 84 is provided with apertures 89 corresponding to the shape of the insignia.

The actuating means for the cover member comprises a pair of actuating rods 98 attached to block 83 and extending upwardly through frame head 72 and support member 67. Coil springs 99 encircle rods 98 between nuts 100 thereon and support member 67. Nut members 98' on rods 98 abut the lower surface of support member 67. Coil springs 101 encircle rods 98 within frame head 72 and nuts 102 on rods 98 engage the upper ends of springs 101.

The cutter member comprises a plate 103 and one or more thin walled cutters 138 formed to the shape of the insignia and extending downwardly from plate 103. The actuating means for such cutter member comprises a pair of actuating rods 105 fastened to diagonally opposite corners of plate 103 and extending upwardly through said frame head 72. A pair of coil springs 106 encircle said rods 105 within the frame head 72, a pair of nuts 107 threaded to rods 105 adjust the compression on springs 106, and nut members 108 on rods 105 may abut the lower end of frame head 72.

The plunger member 70 comprises a plate 109 and one or more plungers 110 which have the same shape and contour as the desired insignia and which fit into the cutters 138 and into the apertures 89 in projection 84 of the cover member. Said plungers 110 extend downwardly from plate 109 which is provided near each corner with holes through which extend the pairs of actuating rods 98 and 105. An actuating rod 111 is attached at its lower end to the center of plate 109 and extends upwardly through the frame head 72. A coil spring 112 encircles said rod 111 between a nut 113 threaded thereon and the upper portion of frame head 72. An adjusting nut 114 is also threaded onto rod 111 and is adapted to abut against the lower end of frame head 72. A pair of abutments 109' are adjustably mounted or threaded into plate 109.

The frame head 72 of the preferred insert forming and injection station is operated as described previously and as shown in Fig. 21 and at the beginning of the cycle the actuating means spaces the plates 103 and 109 from the block 83 as shown in Fig. 7. In such position of plate 103 the lower ends of cutters 138 are above the guideway 139 so that the insert soap strip 140 can be fed therealong either manually or in some mechanical manner not shown. At the same time the bottom ends of plungers 110 are above guideway 139 and are preferably flush with the beveled ends 138' of cutters 138, see Fig. 22.

The first step of this preferred method or insert forming cycle of the machine is illustrated in Figs. 17 and 18 and takes place during the first part of the downward movement of frame head 72 of the actuating means. During such movement of frame head 72 the compression on springs 106 is increased to exert a thrust on actuating rods 105 and move plate 103 toward block 83 and the adjustable stops 117 into engagement therewith. Such movement of plate 103 moves cutters 138 through the strip 140 of insert soap to cut the distinctive soap inserts therefrom and the beveled lower edges 138′ of said cutters 138 fit into or against the beveled upper edges 89′ of the apertures 89 in projection 84. The spring 112 may be arranged so that plate 109 and plungers 110 are not moved during said first step of the cycle or are at most only moved to bring the bottom ends of plungers 110 against the upper surface of strip 140. Also during said first step of the cycle the springs 99 oppose and prevent any appreciable movement of block 83.

Continued movement of frame member 72 after stops 117 on plate 103 abut against block 83 accomplishes the second step of the preferred method and apparatus as shown in Figs. 19 and 20. Further movement of frame member 72 places spring 112 under sufficient compression to move plate 109 toward plate 103 and relieves the compression on springs 101 so that block 83 and projection 84 are simultaneously moved toward the mold member, and cake engaging surface 85 on projection 84 abuts against the cake 29 in the mold members, and dowels 83′ move into corresponding recesses 50′ in frame 50. As the downward movement of frame head 72 continues the plate 109 is moved downwardly and the distinctive soap inserts 34′ are injected into the soap cake 29 and/or into apertures 65 previously provided therein. As before such injection of the inserts 34′ reshapes or reforms the apertures 65. If the soap material for inserts 34′ is sufficiently harder than the material of soap cake 29, the inserts 34′ may be injected directly into the soap cake 29 without any previous provision of apertures therein.

Finally the abutments 109′ on plate 109 engage the top of block 83 and the lower faces of plungers 110 are located in flush, recessed or protruding relationship with respect to the cake engaging surface 85 on projection 84. Again the whole insert forming and injecting station may be pressed to exert a final finishing operation upon the composite soap cake 29 and distinctive insert 34′.

During the return of the frame head 72 to its uppermost position, the plates 103 and 109 are displaced from block 83 and returned to their original positions. The retraction of cutter or cutters 138 from the strip 140 of insert soap will tend to carry the said strip 140 along but the upper wall of the guideway 139 acts as a stripper to prevent this. Thus it will be understood that the opening or openings 141 in block 83 need not correspond at all to the contour of the cutter or cutters 138 as long as the insert soap in strip 140 is cleanly stripped from the cutters 138.

After the insert injection has been accomplished and the carrier rotated, the rise 49 of cam member 47 will radially move the stem 55 and bottom members 51 of the mold member to eject the finished composite soap cake therefrom.

While various forms of the invention have been shown herein, it is to be understood that invention may be accomplished in still other forms or arrangements, for instance it is clear that the actuating means or mechanism for the various stations can be provided in a variety of ways. Consequently, the present disclosure is to be construed only in an illustrative sense and the scope of the invention is defined in the claims which follow.

Having now particularly described my invention what I desire to secure by Letters Patent of the United States and what I claim is:

1. The method of making a soap cake having a distinctive insignia, which comprises forming from dry soap material a hard distinctive insert having the shape of the desired insignia, providing in said soap cake a recess smaller than the display surface of said insignia, and pressing said hard insert into the recess in said soap cake of softer soap material and displacing the soft soap of said cake by said hard soap insert.

2. The method of making a soap cake having a distinctive insignia, which comprises pressing into a recess provided in a soap cake a distinctive insert having a display surface larger than said recess and of soap material that is relatively drier than the soap of said soap cake, and shaping said recess by introduction of said harder insert so that said insert fits precisely into said soap cake.

3. The method of making a soap cake having a distinctive insignia, which comprises forming from relatively drier soap material a distinctive insert having the shape of the desired insignia, pressing said insert immediately after its formation into a recess in the softer soap cake, which recess is smaller than the display surface of said insignia, and shaping said recess by introduction of said insert of drier soap material so that said insert and soap cake are precisely complementary and well bonded to each other.

4. The method of making a soap cake having a distinctive insignia, which comprises providing in a soap cake a recess having the shape of but smaller than the display surface of said insignia, softening the soap material forming the walls of said recess, pressing into said recess a distinctive insert of relatively dry soap material and having the size and shape of said insignia and larger than said recess, and shaping said recess by introduction of said insert of drier soap material which insert itself cuts away softened portions of the soap cake precisely to the size and shape of said insert.

5. The method of making a soap cake having a distinctive insignia extending partially therethrough, which comprises providing in a soap cake a recess of greater depth than the insignia but less than the thickness of said cake, forming from a relatively dry soap material a distinctive insert having the shape of the desired insignia and larger in area than said recess and shorter than the depth of said recess, and pressing said drier soap insert into said soap cake to reshape the recess therein by means of said insert which displaces portions of the soap cake and moves them to the space between the bottom of said recess and the end of said insert.

6. The method of making a soap cake having a distinctive insignia extending only partially therethrough, which comprises forming from dry soap material a hard distinctive insert having the shape and depth of the desired insignia, and pressing said hard insert a distance corresponding to the depth thereof into a recess in a soap cake of softer soap material, which recess is smaller than the display surface of said insignia, and displacing the softer soap of said cake by said hard distinctive soap insert.

7. The method of making a soap cake having a distinctive insignia, which comprises providing in a soap cake a recess smaller than the display area of the insignia, extruding from a soap material that is drier than the soap of said cake an insert having the shape of the desired insignia, and immediately introducing the extruded insert of drier soap into the smaller recess in said soap cake and thereby shaping said recess to correspond precisely to the form of said insert.

8. The method of making a soap cake having a distinctive insignia, which comprises providing in a soap cake a recess having the configuration of but smaller than the display area of said insignia, molding a soap insert of relatively dry soap material in a die formed by the core for recessing said soap cake, and pressing the drier soap insert into said recess and thereby reshaping said soap cake.

9. The method of making a soap cake having a distinctive insignia, which comprises providing within the soap cake an aperture corresponding to but smaller than the display area of the insignia desired, and extruding a soap insert of relatively dry soap material for insertion into said aperture through a die molded around the core used to form the aperture in said soap cake.

10. The method of making a soap cake having a display surface including a distinctive insignia, which comprises forming an insert having the shape of the desired insignia from distinctive and relatively dry soap material having a grain substantially parallel to the display end surface of said insignia, providing in the soap cake a recess of smaller size than said insert, and pressing said drier soap insert in a direction perpendicular to the grain thereof into the recess in said soap cake and thereby shaping said recess to correspond precisely to the shape of said insert.

11. The method of making a soap cake having a display surface including a distinctive insignia, which comprises compressing a soap material which is distinctive from and relatively drier than the material of said soap cake and thereby arranging the grain in such distinctive soap material in a predetermined direction, removing from said distinctive soap material in a direction perpendicular to the grain thereof an insert having the shape of the desired insignia providing in the soap cake a recess smaller than the display area of said insert, and pressing said drier soap insert in a direction perpendicular to the grain thereof into the recess in said soap cake and thereby shaping said recess to correspond precisely to the shape of said insert.

12. The method of making a soap cake having a distinctive insignia, which comprises compressing a soap material which is drier than and distinctive from said soap cake and thereby arranging the grain in such distinctive soap material in a predetermined direction, punching from said distinctive and drier soap material in a direction perpendicular to the grain thereof an insert having the shape of the desired insignia, providing in said soap cake a recess smaller than the display surface of said insignia, and pressing said insert in a direction perpendicular to the grain thereof into said recess in the soap cake and thereby reshaping the recess in said soap cake to correspond precisely to the form of said insert.

13. The method of making a soap cake having a distinctive insignia, which comprises cutting an insert having the shape of the desired insignia from a comparatively dry soap material having a predetermined grain by moving a cutter in a direction perpendicular to the plane of said grain, providing in said soap cake a recess smaller than the display surface of said insignia, and pressing said insert of drier soap material from the cutter in a direction also perpendicular to the grain of said insert into said recess in the soap cake of softer soap material and thereby reshaping the recess in said soap cake to correspond precisely to the shape of said insert.

LESLIE A. BLOCK.

REFERENCES CITED

The following references are of record in the file of this patent:

UNITED STATES PATENTS

| Number | Name | Date |
|---|---|---|
| 683,181 | Mereness | Sept. 24, 1901 |
| 1,876,826 | Armstrong et al. | Sept. 13, 1932 |
| 2,292,359 | Block | Aug. 11, 1942 |
| 1,910,904 | Moore | May 23, 1933 |
| 1,791,359 | Henrikson | Feb. 3, 1931 |
| 1,267,949 | Williams | May 28, 1918 |